US012276957B2

(12) United States Patent
Büttner et al.

(10) Patent No.: US 12,276,957 B2
(45) Date of Patent: Apr. 15, 2025

(54) AUTOMATION NETWORK AND METHOD FOR TRANSMITTING DATA IN AN AUTOMATION NETWORK

(71) Applicant: Beckhoff Automation GmbH, Verl (DE)

(72) Inventors: Holger Büttner, Berlin (DE); Dirk Janssen, Verl (DE); Erik Vonnahme, Salzkotten (DE); Thorsten Bunte, Gütersloh (DE); Thomas Rettig, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 459 days.

(21) Appl. No.: 17/723,696

(22) Filed: Apr. 19, 2022

(65) Prior Publication Data

US 2022/0236712 A1 Jul. 28, 2022

Related U.S. Application Data

(63) Continuation of application No. PCT/EP2020/082075, filed on Nov. 13, 2020.

(30) Foreign Application Priority Data

Nov. 25, 2019 (DE) ...................... 10 2019 131 823.8

(51) Int. Cl.
*G05B 19/05* (2006.01)
*H04L 12/42* (2006.01)

(52) U.S. Cl.
CPC ............ *G05B 19/052* (2013.01); *H04L 12/42* (2013.01); *G05B 2219/1214* (2013.01); *G05B 2219/1215* (2013.01); *H04L 2012/421* (2013.01)

(58) Field of Classification Search
CPC .......... G05B 19/052; G05B 2219/1214; G05B 2219/1215; H04L 12/42; H04L 2012/421
See application file for complete search history.

(56) References Cited

U.S. PATENT DOCUMENTS 8,055,826 B2  11/2011  Janssen et al.
11,201,759 B1 * 12/2021 Kalra ...................... H04L 12/42
(Continued)

FOREIGN PATENT DOCUMENTS

DE  102005016596 A1  10/2006
DE  102006018884 A1  10/2007
(Continued)

OTHER PUBLICATIONS

"EtherCAT—the Ethernet Fieldbus," EtherCAT Technology Group, Nov. 2012, 21 pages.
(Continued)

*Primary Examiner* — Basil T. Jos
*Assistant Examiner* — Jay Khandpur
(74) *Attorney, Agent, or Firm* — Dorsey & Whitney LLP

(57) ABSTRACT

An automation network comprises at least one primary subscriber, at least one switch, and at least one network subscriber. The primary subscriber comprises primary ports, the switch comprises switching ports, and the subscriber comprises subscriber ports, each comprising a transmitter and a receiver. The primary subscriber is configured to output first and second telegrams to first and second switching ports via first and second primary ports and first and second primary communication paths. The switch is configured to forward the first telegram to a first port of a network subscriber via a first subscriber communication path, and to forward the second telegram to a second port of a network subscriber via a second subscriber communication path. In an error mode, the switch and network subscriber are configured to return the first and/or second telegrams to the primary subscriber via the first and/or second primary port.

20 Claims, 4 Drawing Sheets

(56) References Cited

U.S. PATENT DOCUMENTS

| | | | |
|---|---|---|---|
| 2007/0274208 A1 | 11/2007 | Harter et al. | |
| 2009/0179600 A1* | 7/2009 | Worrall | G05B 19/4185 |
| | | | 318/66 |
| 2009/0274068 A1* | 11/2009 | Kostner | H04L 41/0803 |
| | | | 370/255 |
| 2013/0325996 A1* | 12/2013 | Selig | H04L 12/42 |
| | | | 709/208 |
| 2016/0344629 A1 | 11/2016 | Gray | |
| 2018/0309698 A1* | 10/2018 | Takahashi | H04L 12/437 |

FOREIGN PATENT DOCUMENTS

| | | |
|---|---|---|
| DE | 102016113322 A1 | 1/2018 |
| EP | 1869836 B1 | 3/2009 |
| EP | 2216938 A1 | 8/2010 |

OTHER PUBLICATIONS

International Search Report and Written Opinion dated Feb. 15, 2021 in connection with PCT/EP2020/082075, 20 pages including English translation.

International Preliminary Report on Patentability dated Feb. 17, 2022 in connection with PCT/EP2020/082075, 19 pages including English translation.

Zehrer Gudrun, Zehrer, Gudrun, Switch mit VLAN unterstützt EThercat-Segmente. Oct. 22, 2019, 4 pages with English translation.

* cited by examiner

AUTOMATION NETWORK AND METHOD FOR TRANSMITTING DATA IN AN AUTOMATION NETWORK

CROSS-REFERENCE TO RELATED APPLICATIONS

The application is a continuation of International Patent Application PCT/EP2020/082075, filed 13 Nov. 2020, entitled AUTOMATION NETWORK AND METHOD FOR TRANSMITTING DATA IN AN AUTOMATION NETWORK, which claims the priority of German patent application DE 10 2019 131 823.8, filed 25 Nov. 2019, entitled AUTOMATISIERUNGSNETZWERK UND VERFAHREN ZUR DATENÜBERTRAGUNG IN EINEM AUTOMATISIERUNGSNETZWERK, each of which is incorporated by reference herein, in the entirety and for all purposes.

FIELD

The present invention relates to an automation network. Furthermore, the invention relates to a method for transmitting data in the automation network.

BACKGROUND

Automation networks are frequently operated as "field-bus systems". These are industrial bus systems that allow for real-time capable control of the machines or systems of the automation network, wherein the machines or systems of the automation network are controlled via programmable logic controllers (PLCs). The PLC uses the field-bus system to communicate the field devices, e.g. sensors and actuators of the machines or systems of the automation network with the PLC. If a plurality of network subscribers send telegrams via the same data line in the automation network, which may be embodied as a wired or wireless bus system, there must be a way for the network subscribers to share the same data line for transmitting data. For this purpose, defined hierarchies and standardized protocols are provided.

In most cases, the field-bus systems operate in so-called "master-slave mode". This means that at least one network subscriber is embodied as a master subscriber and takes over the control of the processes, while the other network subscribers, which may comprise a plurality of slave subscribers, take over the processing of partial tasks in the control mode of the automation network. The exchange of data in the automation network is carried out using telegrams that are output by the master subscriber to the slave subscribers. The slave subscribers read the output data addressed to them from the telegram and place their input data into the telegram and return the telegram to the master subscriber.

The automation networks are frequently embodied as Ethernet-based networks or as an Ethernet-based field bus. This means that the real-time capable protocol on which the telegram traffic in the automation network is based may e.g. be the EtherCAT protocol. An automation network with an underlying EtherCAT protocol, hereinafter referred to as EtherCAT network for short, which is known from the prior art, comprises a direct connection between the master subscriber and the individual network subscribers or slave subscribers. The master subscriber and the network subscribers or slave subscribers are therefore each connected to one another via a point-to-point connection without intermediate stations, e.g. in the form of network distributors, via a data line network. A telegram from the master subscriber passes through all the slave subscribers connected to the data line network one after the other, each of which processes the telegram on the fly, and the last slave subscriber returns the telegram to the master subscriber via the data line network.

In error mode, i.e. in the event that an interference has occurred on the line, e.g. due to a physical interruption of the transmission medium, the master subscriber may in this way only address the part of the slave subscribers via the data line network that is located upstream of the location of interference.

EP 1869836 B1 describes a method in which the last slave subscriber is reconnected to the master subscriber via a redundant data line network. The master subscriber sends a first telegram to the first slave subscriber, which passes through the remaining slave subscribers one after the other, and a second telegram to the last slave subscriber, which passes through the remaining slave subscribers one after the other in the opposite direction. In particular, the method ensures that the master subscriber may address both the slave subscribers upstream of the location of interference and the slave subscribers downstream of the location of interference, as viewed from the master subscriber, using telegrams during error mode.

If the EtherCAT network with the redundant data line network is extended by network distributors, which may be embodied as so-called switches or branches, the above-mentioned method can only be applied to a limited extent to those areas of the EtherCAT network in which only slave subscribers are arranged. A communication of the master subscriber via telegrams with all slave subscribers may thus not be operated further in error mode.

SUMMARY

The present invention provides an optimized automation network and an improved method for transmitting data in the proposed automation network.

EXAMPLES

According to a first aspect, an automation network is proposed. The automation network comprises a plurality of network subscribers comprising at least a master subscriber, at least a switch, and at least a slave subscriber. The master subscriber comprises master ports, the switch comprises switching ports, and the slave subscriber comprises slave ports, each comprising a transmitter for transmitting telegrams and a receiver for receiving telegrams.

The transmitter of a first master port is connected to the receiver of a first switching port via a first master communication path, and the transmitter of a second switching port is connected to the receiver of a second master port via the first master communication path. The transmitter of the second master port is connected to the receiver of the second switching port via a second master communication path, and the transmitter of the first switching port is connected to the receiver of the first master port via the second master communication path to form a first dual ring structure.

The transmitter of a third switching port is connected to the receiver of a first slave port via a first slave communication path, and the transmitter of a second slave port is connected to the receiver of a fourth switching port via the first slave communication path. The transmitter of the fourth switching port is connected to the receiver of the second slave port via a second slave communication path, and the transmitter of the first slave port is connected to the receiver of the third switching port via the second slave communication path to form a second dual ring structure.

The master subscriber is embodied to send two telegrams based on the same data packet. The master subscriber is embodied to output a first telegram to the switch via the transmitter of the first master port and via the first master communication path, and to output a second telegram to the switch via the transmitter of the second master port and via the second master communication path. The switch is embodied to receive the first telegram via the receiver of the first switching port, and to forward the first telegram to the receiver of the first slave port via the transmitter of the third switching port and via the first slave communication path. The slave subscriber is embodied to forward the first telegram, after processing in passing, to the receiver of the fourth switching port via the transmitter of the second slave port via the first slave communication path.

The switch is embodied to forward the first telegram received via the receiver of the fourth switching port to the receiver of the second master port via the transmitter of the second switching port via the first master communication path. The switch is embodied to receive the second telegram via the receiver of the second switching port and to forward it via the transmitter of the fourth switching port to the receiver of the second slave port via the second slave communication path. The slave subscriber is embodied to forward the second telegram via the transmitter of the first slave port over the second slave communication path to the receiver of the third switching port. The switch is embodied to forward the second telegram received via the receiver of the third switching port to the receiver of the first master port via the transmitter of the first switching port via the second master communication path. The switch and the slave subscriber are in error mode configured to return the first telegram to the master subscriber so that the master subscriber receives the first telegram via the receiver of the first master port and/or to return the second telegram to the master subscriber so that the master subscriber receives the second telegram via the receiver of the second master port.

According to a second aspect, a method for transmitting data in the automation network is proposed. The automation network comprises a plurality of network subscribers comprising at least a master subscriber, at least a switch, and at least a slave subscriber. The master subscriber comprises master ports, the switch comprises switching ports, and the slave subscriber comprises slave ports, each of which comprises a transmitter for transmitting telegrams and a receiver for receiving telegrams.

The transmitter of a first master port is connected to the receiver of a first switching port via a first master communication path and the transmitter of a second switching port is connected to the receiver of a second master port via the first master communication path. The transmitter of the second master port is connected to the receiver of the second switching port via a second master communication path, and the transmitter of the first switching port is connected to the receiver of the first master port via the second master communication path to embody a first dual ring structure.

The transmitter of a third switching port is connected to the receiver of a first slave port via a first slave communication path and the transmitter of a second slave port is connected to the receiver of a fourth switching port via the first slave communication path. The transmitter of the fourth switching port is connected to the receiver of the second slave port via a second slave communication path and the transmitter of the first slave port is connected to the receiver of the third switching port via the second slave communication path to embody a second dual ring structure.

The master subscriber sends two telegrams based on the same data packet, wherein a first telegram is output to the switch via the transmitter of the first master port and via the first master communication path, and a second telegram is output to the switch via the transmitter of the second master port and via the second master communication path. The switch receives the first telegram via the receiver of the first switching port and forwards it to the receiver of the first slave port via the transmitter of the third switching port and via the first slave communication path. After processing on the fly, the slave subscriber forwards the first telegram via the transmitter of the second slave port via the first slave communication path to the receiver of the fourth switching port.

The switch forwards the first telegram received via the receiver of the fourth switching port to the receiver of the second master port via the transmitter of the second switching port via the first master communication path. The switch receives the second telegram via the receiver of the second switching port and forwards it to the receiver of the second slave port via the transmitter of the fourth switching port via the second slave communication path. The slave subscriber forwards the second telegram to the receiver of the third switching port via the transmitter of the first slave port via the second slave communication path. The switch forwards the second telegram received via the receiver of the third switching port to the receiver of the first master port via the transmitter of the first switching port via the second master communication path. The switch and the slave subscriber are embodied to return the first telegram to the master subscriber in error mode so that the master subscriber receives the first telegram via the receiver of the first master port and/or to return the second telegram to the master subscriber in error mode so that the master subscriber receives the second telegram via the receiver of the second master port.

According to a third aspect, a method for transmitting data in an automation network for an error mode is proposed. The automation network comprises at least one master subscriber, at least one switch, and at least one slave subscriber. The master subscriber comprises master ports, the switch comprises switching ports, and the slave subscriber comprises slave ports, each comprising a transmitter and a receiver. The master subscriber is configured to output a first telegram to a first switching port via a first master port and a first master communication path, and to output a second telegram to a second switching port via a second master port and a second master communication path.

The switch is configured to forward the first telegram to a first slave port of a slave subscriber via a first slave communication path, and to forward the second telegram to a second slave port of a slave subscriber via a second slave communication path. In error mode, the switch and the slave subscriber are configured to return the first telegram to the master subscriber such that it receives the first telegram via the first master port and/or to return the second telegram to the master subscriber such that it receives the second telegram via the second master port.

In spite of the error mode, which may include a line interference in the first dual ring structure, i.e. e.g. a physical interruption of the transmission medium on the first master communication path and/or an interruption on the second master communication path, and/or a line interference of the second dual ring structure, i.e. a physical interruption of the transmission medium on the first slave communication path and/or a physical interruption of the transmission medium on the second slave communication path, safe operation of the automation network may be maintained. Consequently, the proposed automation network with the redundant dual ring topology provides improved resilience and guarantees a real-time capability of the automation network. Advantageously, the proposed automation network is thereby not limited to a master-slave structure, but may be extended by a switch that may comprise one and/or more network distributors, i.e., switches or branches, and continues to guarantee communication between the master subscriber with the slave subscriber despite the error mode, so that the master subscriber may reach any network subscriber provided that the network subscriber is still connected to the master subscriber via a communication path.

In particular, the proposed method may reduce the telegram traffic in the automation network compared to other redundancy methods, i.e., the overhead in the automation network may be cut in half, since in other redundancy methods the corresponding telegram is basically doubled at a branch, i.e., a switch, regardless of whether a line interference occurs in the automation network or not.

In a further embodiment, a plurality of slave subscribers is provided that are arranged in a chain. The slave subscribers in the chain are each connected via the first slave port and via the second slave port. The chain of slave subscribers is connected to the third switching port and to the fourth switching port via the first slave communication path and the second slave communication path. A chain of slave subscribers may be connected to the second dual ring structure and connected to the third switching port and the fourth switching port. Advantageously, the behavior of a slave subscriber in the chain in error mode does not differ from the behavior in normal mode, i.e., without line interference. This is because a slave subscriber in the chain processes a telegram via an integrated processor on the fly, and only on the forward path of the telegram, which may be formed by the first slave communication path, for example, while the last slave subscriber sends the telegram back to the master subscriber via the second slave communication path, for example, due to a short-circuited second slave port.

In the event of a line interference between two adjacent slave subscribers in the chain, the slave subscriber adjacent to the interference, where the adjacent slave subscriber e.g. be located adjacent to the interrupted data line, i.e. to the corresponding fault, detects that there is no connection to a subsequent slave subscriber, so that the adjacent slave subscriber short-circuits the transmitter of the second slave port to the receiver of the second slave port in order to return the telegram via the second slave communication path. The second slave communication path is e.g. connected to the receiver of the second slave port.

In another embodiment, a plurality of switches is provided that is arranged in a chain. The chain of switches is connected to the first master port and the second master port via the first master communication path and via the second master communication path. The first telegram and/or the second telegram each have address information indicating to the corresponding switch whether the first telegram is intended for the first slave communication path and/or whether the second telegram is intended for the second slave communication path and/or whether the first telegram is intended for the first master communication path and/or whether the second telegram is intended for the second master communication path.

The proposed automation network may advantageously comprise a plurality of switches, to each of which a chain of slave subscribers may be connected in a double ring structure. The proposed automation network may guarantee simple expandability of the network, while at the same time continuing to maintain the fail-safety of the automation network. In addition, the proposed automation network together with the method offers the advantage that adaptation to individual system requirements is possible. The address information in the telegram means that the respective telegram may quickly be forwarded in the automation network to the network subscriber intended for the telegram.

In another embodiment, the switch comprises a first network distributor and a second network distributor, each having a plurality of distribution ports. A first distribution port of the first network distributor corresponds to the first switching port of the switch, and a second distribution port of the first network distributor corresponds to the third switching port of the switch. The first network distributor is connected to a first distribution port of the second network distributor via a third distribution port of the first network distributor.

The switch may comprise a first and a second network distributor, wherein the first network distributor and the second network distributor may be embodied to output telegrams via the distribution ports and, based on the address information of the telegrams, to the network subscribers for which the telegrams are intended. The network distributors may be embodied as switches or as branches, so that their function may be used advantageously. In particular, this may improve the compatibility of the network subscribers in the automation network.

In a further embodiment, a network distributor adjacent to an interference and/or a switch adjacent to an interference is configured in error mode to set a first error information for the first telegram and/or a second error information for the second telegram and to return the first telegram with the first error information to the master subscriber via the second master communication path and/or the second telegram with the second error information back to the master subscriber via the first master communication path.

The switch adjacent to the interference, i.e. the switch which detects the interference, which may particularly be a line interference, on the first master communication path and/or on the second master communication path to a subsequent switch, may set an error information for the corresponding telegram. Similarly, the network distributor adjacent to the interference, i.e. the network distributor that detects the interference, which may equally be a line interference, on the first master communication path and/or on the second master communication path to a subsequent switch, may set an error information for the corresponding telegram.

The error information may comprise changing the telegram address to an alternate telegram address. The master subscriber configures the switch or the corresponding network distributor such that the telegram path for normal operation is set, as well as an alternative telegram path for error operation, wherein setting the telegram path for normal operation comprises assigning the switching ports or the distribution ports to the telegram address for outputting the telegram. Furthermore, setting the alternative telegram path e.g. comprises changing the telegram address to the alternative telegram address, via which the fault that has occurred may be indicated, and assigning the switching ports or the distribution ports to the changed telegram address for outputting the telegram.

In a further embodiment, the network distributor adjacent to an interference and/or the switch adjacent to an interference and/or a slave subscriber adjacent to an interference are embodied in error mode, provided that the first telegram already has the first error information and/or the second telegram already has the second error information, to discard the first telegram with the first error information and/or the second telegram with the second error information. By discarding a telegram when an error information has already been detected in the corresponding telegram, it may be avoided in an advantageous way that the respective telegram circulates in the automation network and takes up unnecessary capacity as well as occupies the transmission medium. In particular, the network distributor adjacent to an interference and/or the switch adjacent to an interference and/or the slave subscriber adjacent to an interference may herein be used advantageously to detect a line interference in the automation network.

In a further embodiment, a slave subscriber is arranged between a first switch and a second switch and/or between a first network distributor and a second network distributor. In error mode, the slave subscriber is embodied to set the first error information for the first telegram and/or the second error information for the second telegram and to return the first telegram with the first error information to the master subscriber via the second master communication path and/or the second telegram with the second error information back to the master subscriber via the first master communication path. This allows a flexible embodiment of the automation network, since the slave subscriber may also be arranged between two neighboring switches as well as between two neighboring network distributors. In an advantageous manner, a slave subscriber may also be embodied to set the error information, which may be implemented in a similar manner to the above explanation, i.e. e.g. by changing the telegram address.

In a further embodiment, the switch and the slave subscriber detect an interference on the first master communication path and/or on the second master communication path and/or on the first slave communication path and/or on the second slave communication path and initiate error mode. Furthermore, it is conceivable that a network distributor is also embodied to detect the interference on the first master communication path and/or on the second master communication path and/or on the first slave communication path and/or on the second slave communication path and to trigger the error mode. In an advantageous manner, both the switch and a slave subscriber are embodied to initiate the error mode by setting the error information in the corresponding telegram, provided that a line interference, e.g. an interruption, has been detected. This feature may be equally fulfilled by a network subscriber.

In a further embodiment, the first telegram and the second telegram are each embodied as EtherCAT telegrams. The known EtherCAT standard may advantageously be used, provided that the telegrams are embodied as EtherCAT telegrams. In particular, the real-time capability of the automation network may be ensured by using the real-time capable data transmission protocol.

The advantageous embodiments and further embodiments of the invention described above and/or indicated in the subclaims may be used individually or in any combination with one another—except, for example, in cases of clear dependencies or incompatible alternatives.

BRIEF DESCRIPTION OF THE DRAWINGS

The above-described properties, features and advantages of the present invention, as well as the manner in which they are achieved, will become clearer and more clearly understood in connection with the following description of embodiments, which will be described in more detail in connection with the schematic drawings, in which.

Figure 1:
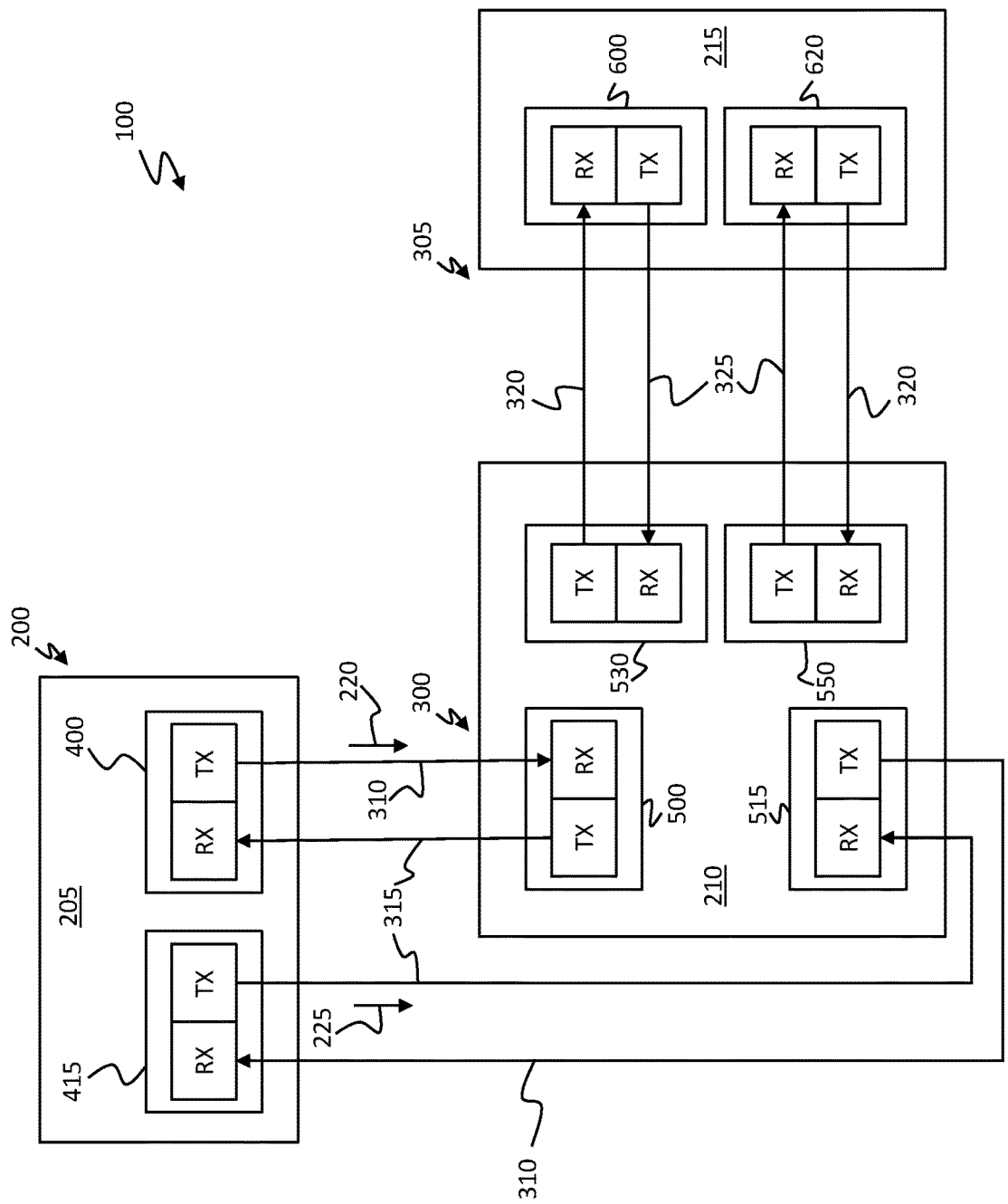
FIG. 1 shows a schematic structure of an automation network with network subscribers according to a first embodiment.

It is to be noted that the figures are merely schematic in nature and not to scale. In this sense, components and elements shown in the figures may be exaggeratedly large or reduced in size for better understanding. Furthermore, it is pointed out that the reference numerals in the figures have been chosen to remain unchanged if the elements and/or components are of the same embodiment.

DETAILED DESCRIPTION

Automation networks 100 are usually implemented as field-bus systems in which the network subscribers 200 are interconnected via the field bus. The automation network 100 may comprise a master subscriber 205, at least a switch 210, and a plurality of slave subscribers 215. The master subscriber 205 may be connected to the switch 210 and the switch 210 may be connected to the plurality of slave subscribers 215 via a redundant data line network, wherein the redundant data line network may e.g. comprise two physical transmission media, for transmitting a first telegram 220 and a second telegram 225 of the master subscriber 205 to the switch 210 and to the plurality of slave subscribers 215 in opposite directions. The redundant data line network may ensure that the master subscriber 205 may continue to communicate with all slave subscribers 215, in particular during error mode, e.g. due to a physical interruption of the transmission medium.

The proposed automation network and the methods for data transmitting in the network are in the following described by way of example on the basis of the real-time capable EtherCAT protocol and is not limited to a master-slave hierarchy.

In the following, the term "on the fly" is understood to mean that a processor of a slave subscriber 215 is embodied to start processing a telegram before the telegram has been completely received via a first slave port 600 of the slave subscriber 215. Where reference is made in the following to processing a telegram in passing, this includes reading out the output data addressed to the respective slave subscriber 215, as well as inserting input data into the telegram and, in normal operation of the automation network 100, forwarding the telegram to the subsequent slave subscriber 215.

In the following, the term "normal operation" is understood to mean the state or mode of operation of the automation network 100 in which no interference occurs.

In the following, the term "error mode" refers to the state or mode of operation of the automation network 100 in which a line interference, which may be in the form of a physical interruption of the transmission medium, occurs in the automation network 100 and which impedes continuous communication of the master subscriber 205 with the slave subscribers 215.

In the following, a first telegram 220, a second telegram 225, a third telegram 282 and a fourth telegram 284 are each understood as an EtherCAT telegram, i.e. the real-time capable protocol on which the telegrams are based is the EtherCAT protocol. An EtherCAT telegram is embedded in an Ethernet data telegram and therefore has the Ethernet data telegram format structure according to the IEEE 802.3 standard or with a tag field according to the IEEE 802.1Q standard. If in the following, only one of the above-mentioned telegrams or a telegram or an EtherCAT telegram is mentioned, the Ethernet data telegram or the data telegram is included.

The core idea of the present automation network and methods for data transmitting in the automation network lies in providing a method and an automation network 100 with network subscribers 200, which, when using at least one switch 210 and a redundant data line network, allows the telegrams of the master subscriber 205 to be returned to the master subscriber 205 by the slave subscribers 215 and/or by the switch 210 in error mode, i.e. in the event of a physical interruption of the transmission medium, and communication of the master subscriber 205 with all other network subscribers 200 may thereby be guaranteed.

The structure and functionality of the automation network 100 is described below with reference to FIGS. 1 to 4, with the associated reference numerals from the four figures being used in the description where useful and necessary.

FIG. 1 shows an automation network 100 comprising a plurality of network subscribers 200, wherein at least one network subscriber 200 may be configured as a master subscriber 205, at least one network subscriber 200 may be configured as a switch 210, and a plurality of network subscribers 200 may be configured as slave subscribers 215. For example, a slave subscriber 215 is shown in FIG. 1. The master subscriber 205 comprises a first master port 400 and a second master port 415, and the switch 210 comprises a first switching port 500 and a second switching port 515 and a third switching port 530 and a fourth switching port 550. The slave subscriber 215 comprises a first slave port 600 and a second slave port 620, each of said ports comprising a transmitter TX for transmitting telegrams and a receiver RX for receiving telegrams.

The transmitter TX of the first master port 400 is connected to the receiver RX of the first switching port 500 via a first master communication path 310. Furthermore, the transmitter TX of the second switching port 515 is connected to the receiver RX of the second master port 415 via the first master communication path 310. The transmitter TX of the second master port 415 is connected to the receiver RX of the second switching port 515 via a second master communication path 315. Moreover, the transmitter TX of the first switching port 500 is connected to the receiver RX of the first master port 400 via the second master communication path 315. Accordingly, the master subscriber 205 forms a first dual ring structure 300 via the first master port 400 as well as the second master port 415 with the first master communication path 310 as well as with the second master communication path 315 and the first switching port 500 as well as the second switching port 515 of the switch 210.

Furthermore, the transmitter TX of the third switching port 530 is connected to the receiver RX of the first slave port 600 via a first slave communication path 320. The transmitter TX of the second slave port 620 is connected to the receiver RX of the fourth switching port 550 via the first slave communication path 320. The transmitter TX of the first slave port 600 is further connected to the receiver RX of the third switching port 530 via a second slave communication path 325. Similarly, the transmitter TX of the fourth switching port 550 is connected to the receiver RX of the second slave port 620 via the second slave communication path 325. The slave subscriber 215 forms a second dual ring structure 305 with the switch 210 via the first slave port 600, via the second slave port 620, via the first slave communication path 320, and via the second slave communication path 325.

The master subscriber 205 is embodied to send two telegrams based on the same data packet. For this purpose, the master subscriber 205 outputs a first telegram 220 to the receiver RX of the first switching port 500 via the transmitter TX of the first master port 400 via the first master communication path 310. The switch 210 is embodied to receive the first telegram 220 via the receiver RX of the first switching port 500. Further, the switch 210 is embodied to output the first telegram 220 to the receiver RX of the first slave port via the transmitter TX of the third switching port 530 via the first slave communication path 320. The slave subscriber 215 is embodied to process the first telegram 220 on the fly.

The slave subscriber 215, after processing the first telegram 220, is embodied to output the first telegram 220 to the receiver RX of the fourth switching port 550 via the transmitter TX of the second slave port 620 via the first slave communication path 320. The switch 210 is embodied to receive the first telegram 220 via the receiver RX of the fourth switching port 550, and to transmit it via the transmitter TX of the second switching port 515 via the first master communication path 310 to the receiver RX of the second master port 415. Finally, the master subscriber 205 is configured to receive the first telegram 220 via the receiver TX of the second master port 415. Furthermore, the master subscriber 205 may be embodied to evaluate the first telegram 220.

The master subscriber 205 is further embodied to output a second telegram 225 to the receiver RX of the second switching port 515 via the transmitter TX of the second master port 415 via the second master communication path 315. The switch 210 is configured to receive the second telegram 225 via the receiver RX of the second switching port, and to output the second telegram 225 via the transmitter TX of the fourth switching port 550 via the second slave communication path 325 to the receiver RX of the second slave port 620. For example, the slave subscriber 215 is not embodied to process the second telegram 225 received by the slave subscriber 215 via the receiver RX of the second slave port 620. However, the slave subscriber 215 is embodied to output the second telegram 225 to the receiver RX of the third switching port 530 via the transmitter TX of the first slave port 600 via the second slave communication path 325. The receiver RX of the third switching port 530 is embodied to receive the second telegram 225. The switch 210 is further configured to output the second telegram 225 to the receiver RX of the first master port 400 via the transmitter TX of the first switching port 500 via the second master communication path 315.

The master subscriber 205 is embodied to receive the second telegram 225 via the receiver RX of the first master port 400. Furthermore, the master subscriber 205 may be configured to discard one of the two telegrams, i.e. the first telegram 220 or the second telegram 225. For example, in said embodiment example, the master subscriber 205 may discard the second telegram 225 because the slave subscriber 215 did not process the second telegram 225 on the fly. The master subscriber 205 may, as an alternative to discarding one of the two telegrams, be configured in a read operation to or-link, i.e. to overlay the data in the user data fields of the two telegrams. An or-operation, due to the superposition of the data in the user data fields of the telegrams received by the master subscriber 205 via the first master communication path 310 and via the second master communication path 315 from the slave subscriber 215 or a chain of slave subscribers, may serve to form a common telegram internally in the master subscriber 205.

FIG. 1 thus shows the automation network 100 in normal operation, normal operation being characterized by the fact that the telegram traffic in the automation network 100 runs without interference. The depiction of the automation network 100 shown in FIG. 1 with its network subscribers 200 has been chosen as an example, and does not limit the scope of protection to the depiction shown. The automation network 100 could alternatively deviate from the depiction and comprise network subscribers 200. The terms RX and TX in FIG. 1 generally refer to a receiver RX (RX: "receiver" or "receive") and a transmitter TX (TX: "transceiver" or "transceive").

For example, the first master communication path 310 may be implemented in the form of a first data line, and the second master communication path 315 may be implemented in the form of a second data line. It is conceivable to implement the first slave communication path 320 in the form of a third data line and the second slave communication path 325 in the form of a fourth data line. However, the described embodiment is only exemplary and may also be implemented in alternative ways.

For the sake of clarity, the following figures do not show the transmitters TX and the receivers RX of the individual ports of the network subscribers 200. Nevertheless, the ports of the network subscribers 200 shown in FIGS. 2 to 4 each have a transmitter TX for transmitting the telegrams and a receiver RX for receiving the telegrams.

Figure 2:
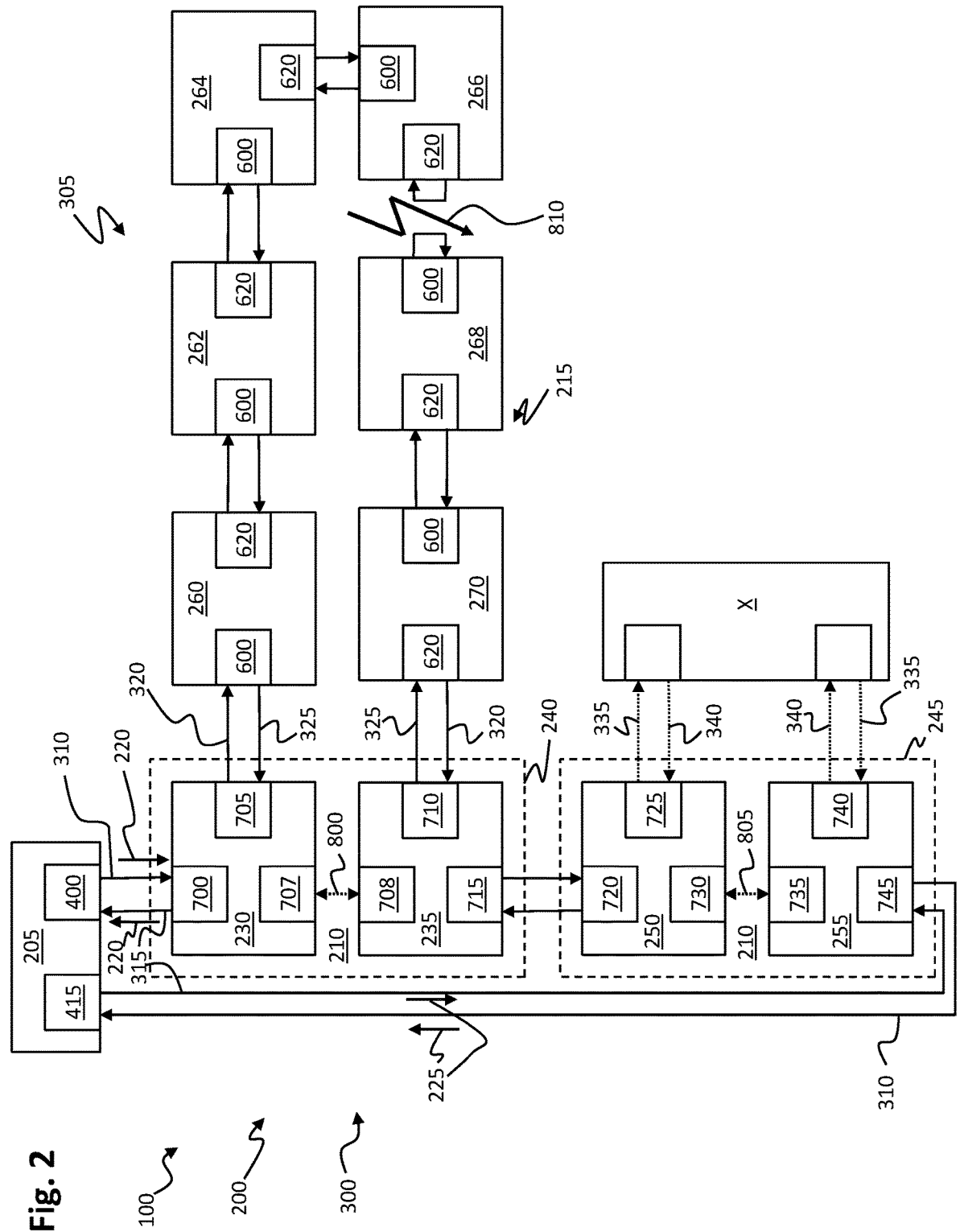
FIG. 2 shows a schematic structure of an automation network with network subscribers according to a second embodiment.

FIG. 2 shows an extension of the automation network 100 shown in FIG. 1. The automation network 100 in FIG. 2 also comprises the master subscriber 205. Furthermore, the automation network 100 in FIG. 2 comprises two switches 210 as a first switch 240 and a second switch 245. In addition, the automation network 100 comprises six slave subscribers 215 as a first slave subscriber 260, a second slave subscriber 262, a third slave subscriber 264, a fourth slave subscriber 266, a fifth slave subscriber 268 and a sixth slave subscriber 270.

The first slave subscriber 260 to sixth slave subscriber 270 are arranged in a chain. The first slave subscriber 260 to the sixth slave subscriber 270 each have the first slave port 600 and the second slave port 620, via which the individual slave subscribers 215 are each connected to one another via the redundant data line network. An exception to the connection of the slave subscribers 215 via the first slave port 600 and via the second slave port 620 is e.g. provided for the section between the fourth slave subscriber 266 and the fifth slave subscriber 268. For example, a first line interference 810 occurs between the fourth slave subscriber 266 and the fifth slave subscriber 268, shown with the lightning bolt in FIG. 2. The first line interference 810 may be a physical interruption of the connection, i.e. the transmission medium, between the fourth slave subscriber 266 and the fifth slave subscriber 268.

For example, in FIG. 2 the first switch 240 and the second switch 245 each comprise two network distributors. For example, the first switch 240 comprises a first network distributor 230 and a second network distributor 235. The second switch 245 may e.g. comprise a third network distributor 250 and a fourth network distributor 255. Accordingly, a plurality of switches 210 may be provided in the automation network 100, which may also be arranged in a chain like the slave subscribers 215 and may be connected to the first master port 400 as well as to the second master port 415 of the master subscriber 205 via the first master communication path 310 as well as via the second master communication path 315. Furthermore, the automation network 100 in FIG. 2 may also include other switches 210. The first network distributor 230 to fourth network distributor 255 each include distribution ports.

For example, a first distribution port 700 of the first network distributor 230 corresponds to the first switching port 500 of the switch 210 shown in FIG. 1. For example, a second distribution port 705 of the first network distributor 230 corresponds to the third switching port 530 of the switch 210 shown in FIG. 1. For example, a second distribution port 710 of the second network distributor 235 may correspond to the fourth switching port 550 of the switch 210 shown in FIG. 1. Moreover, a third distribution port 715 of the second network distribution device 235 may correspond to the second switching port 515 in FIG. 1. Furthermore, the first network distributor 230 and the second network distributor 235 of the first switch 240 may be connected via a first internal connection 800. In this, the first internal connection 800 may e.g. comprise a connection of the third switching port 707 of the first network switch 230 as well as the first switching port 708 of the second network switch 235.

The first internal connection 800, as well as the further internal connections described below, may be similarly configured to embody the line connection for the first master communication path 310 or for the second master communication path 315 or for the first slave communication path 320 or for the second slave communication path 325, as well as for the further slave communication paths explained below, as cable lines, for example, in the form of copper lines, fiber optic lines, or the like. Also, the embodiment of the line connections and the quality of the line redundancy is not dependent on the arrangement of the individual network subscribers 200.

The first switch 240 may be connected to the second switch 245 via the third distribution port 715 of the second network distribution device 235, as well as via the first master communication path 310 and via the second master communication path 315, wherein the connection of the third distribution port 715 of the second network distribution device 235 comprises the connection to the first distribution port 720 of the third network distribution device 250.

The third network distributor 250 may be connected to a placeholder X via the second distribution port 725 of the third network distributor 250 via a third slave communication path 335 as well as via a fourth slave communication path 340. Similarly, the fourth network distributor 255 may be connected to the placeholder X via the second distribution port 740 of the fourth network distributor 255 via the third slave communication path 335 as well as via the fourth slave communication path 340. Here, the placeholder X is representative of a slave subscriber 215 and/or a chain of slave subscribers 215 that may be connected to the second switch 245 via the third slave communication path 335 as well as via the fourth slave communication path 340.

The third network distributor 250 may be connected to a first distribution port 735 of the fourth network distributor 255 via the third distribution port 730 of the third network distributor 250 via a second internal connection 805. Since the second switch 245 may be embodied similarly to the first switch 240, the first distribution port 720 of the third network distributor 250 as well as the second distribution port 725 of the third network distributor 250 may be embodied like the second distribution port 740 of the fourth network distributor 255 and the third distribution port 745 of the fourth network distributor 255 may be embodied like the first switch 240 as explained above. For this reason, reference is made to the above description. The fourth network distributor 255 of the second switch 245 is connected to the second master port 415 of the master subscriber 205 via the third distribution port 745 of the fourth network distributor 255 via the first master communication path 310 and via the second master communication path 315.

The chain of slave subscribers 215 is connected to the first slave port 600 of the first slave subscriber 260 via the first slave communication path 320 and via the second slave communication path 325 to the second distribution port 705 of the first network distributor 230. Furthermore, the last slave subscriber 215 in the chain, that is, the sixth slave subscriber 270 is connected to the second distribution port 710 of the second network distributor 235 via the second slave port 620 through the first slave communication path 320 and via the second slave communication path 325.

In contrast to the description for FIG. 1, the master subscriber 205 in FIG. 2 may e.g. be embodied to specify to the first switching center 240 and the second switching center 245, for example by prior configuration, via which distribution port of the first network distributor 230 and via which distribution port of the second network distributor 235 and via which distribution port of the third network distributor 250 and finally via which distribution port of the fourth network distributor 255 the first network distributor 230 to fourth network distributor 255 has to output a telegram from the master subscriber 205. The first network distributor 230 to the fourth network distributor 255 may e.g. store this setting in the routing table of the respective network distributor in order to then access the stored routing information for the output of the respective telegram via the assigned distribution port when a telegram is received.

In an alternative embodiment, a telegram from the master subscriber 205 may also comprise address information indicating which distribution port the corresponding network distributor is to route a telegram. The address information of a telegram may e.g. be located in the header portion of the telegram in order to make a routing decision as quickly as possible. For example, the master subscriber 205 may be configured to output a first telegram 220 to the first distribution port 700 of the first network distributor 230 via the first master communication path 310. The first network distributor 230 forwards the first telegram 220 to the first slave port 600 of the first slave subscriber 260 via the second distribution port 705 of the first network distributor 230 via the first slave communication path 320.

Receiving the first telegram 220 via the first distribution port 700 of the first network distributor 230 and outputting the first telegram 220 via the second distribution port 705 of the first network distributor 230 may have been set by the master subscriber 205, e.g. prior to sending the first telegram 220 in the first network distributor 230. The first telegram 220 may have a target address, which may be located, for example, in the header portion of the first telegram 220. The target address may e.g. be embodied as a so-called ELAN ID. For the first telegram 220, the ELAN ID may comprise the value 1. The first slave subscriber 260 forwards the first telegram 220 with the ELAN ID 1 via the second slave port 620 of the first slave subscriber 260 to the first slave port 600 of the second slave subscriber 262 via the first slave communication path 320. The first slave subscriber 260 processes the first telegram 220 on the fly and forwards the first telegram 220, and similarly the second slave subscriber 262 forwards the first telegram 220 after processing by the second slave subscriber 262 via the second slave port 620 of the second slave subscriber 262 via the first slave communication path 320 to the first slave port 600 of the third slave subscriber 264.

The third slave subscriber 264 processes the first telegram 220 on the fly and forwards the first telegram 220 to the first slave port 600 of the fourth slave subscriber 266 via the second slave port 620 of the third slave subscriber 264 via the first slave communication path 310. The fourth slave subscriber 266 processes the first telegram 220 on the fly, as well. For example, the fourth slave subscriber 266 may not forward the first telegram 220 to the fifth slave subscriber 268 after processing in passing due to the first line interference 810, which may include an interruption of the first slave communication path 320.

Due to the first line interference 810, the fourth slave subscriber 266 initiates error mode and couples the first telegram 220 having the ELAN ID 1 back to the third slave subscriber 264 via the second slave communication path 325. The internal feedback of the first telegram 220 in the fourth slave subscriber 266, i.e. a short circuit of the transmitter with the receiver of the second slave port 620 of the fourth slave subscriber 266 may e.g. be caused by a short circuit shown in FIG. 2 in the fourth slave subscriber 266 or, respectively, in the other slave subscribers, which comprises, for example, a first multiplexer and a second multiplexer, wherein the first multiplexer and the second multiplexer may be embodied to internally short-circuit the transmitter with the receiver of the corresponding slave port, respectively, so that the telegram may be sent back to the master subscriber 205 via the other slave communication path.

The fourth slave subscriber 266 sends the first telegram 220 with the ELAN ID 1 via the first slave port 600 of the fourth slave subscriber 266 and via the second slave communication path 325 to the second slave port 620 of the third slave subscriber 264. The third slave subscriber 264 now no longer processes the first telegram 220 with the ELAN ID 1, but sends the first telegram 220 via the first slave port 600 of the third slave subscriber 264 and via the second slave communication path 325 to the second slave port 620 of the second slave subscriber 262. The second slave subscriber 262 is also not embodied to process the first telegram 220 again, either. The second slave subscriber 262 transmits the first telegram 220 via the first slave port 600 of the second slave subscriber 262 and via the second slave communication path 325 to the second slave port 620 of the first slave subscriber 260. However, the first slave subscriber 260 is again not configured to reprocess the first telegram 220.

The first slave subscriber 260 outputs the first telegram 220 via the first slave port 600 of the first slave subscriber 260 and via the second slave communication path 325 to the second distribution port 705 of the first network distributor 230. The first network distributor 230 outputs the first telegram 220 to the first master port 400 of the master subscriber 205 via the first distribution port 700 of the first network distributor 230 and via the second master communication path 315. The first network distributor 230 may output the first telegram 220 directly via the first distribution port 700 of the first network distributor 230 since e.g. the first telegram 220 has been preset by the master subscriber 205 to be received or output by the first network distributor 230 via the first distribution port 700 of the first network distributor 230 and via the second distribution port 705 of the first network distributor 230, respectively.

For example, a second telegram 225 output by the master subscriber 205 via the second master port 415 and via the second master communication path 315 may comprise an ELAN ID 2, which may be included in the header portion of the second telegram 225. It is conceivable that the master subscriber 205 may set for the third network distributor 250 and the fourth network distributor 255 that the third network distributor 250 and the fourth network distributor 255 each receive the second telegram 225 having the ELAN ID 2 via the third distribution port 745 of the fourth network distributor 255, and the fourth network distributor 255 outputs the second telegram 225 via the first distribution port 735 of the fourth network distributor 255 to the third distribution port 730 of the third network distributor 250 via a second internal connection 805. The second network distributor 250 may output the second telegram 225 to the third distribution port 715 of the second network distributor 235 via the first distribution port 720 of the third network distributor 250 over the second master communication path 315. The second network distributor 235 may output the second telegram 225 to the second slave port 620 of the sixth slave subscriber 270 via the second distribution port 710 of the second network distributor 235 via the second slave communication path 325.

In this regard, as explained above, the master subscriber 205 may preset for the second network distributor 235 that the second network distributor 235 receives the second telegram 225 via the third distribution port 715 of the second network distributor 235 and forwards it via the second distribution port 710 of the second network distributor 235. The sixth slave subscriber 270 forwards the second telegram 225 to the second slave port 620 of the fifth slave subscriber 268 via the first slave port 600 of the sixth slave subscriber 270 over the second slave communication path 325. Since the second slave communication path 325 between the fifth slave subscriber 268 and the fourth slave subscriber 266 is interrupted, e.g. by the first line interference 810, the fifth slave subscriber 268 cannot forward the second telegram 225 to the fourth slave subscriber 266. For this reason, the fifth slave subscriber 268 triggers the error mode, just as the fourth slave subscriber 266 has already done for the first telegram 220.

Also, the fifth slave subscriber 268 may have a coupling device comprising a first multiplexer and a second multiplexer to short-circuit the transmitter to the receiver of the first slave port 600 of the fifth slave subscriber 268 to feedback the second telegram 225 in the fifth slave subscriber 268 so that the fifth slave subscriber 268 may process the second telegram 225 on the fly after the short-circuit. The fifth slave subscriber 268 outputs the second telegram 225 to the adjacent slave subscriber, i.e. the sixth slave subscriber 270 in the example shown, via the first slave communication path 320 after processing it on the fly.

The sixth slave subscriber 270 receives the second telegram 225 via the first slave port 600 of the sixth slave subscriber 270, processes the second telegram 225 on the fly, and then outputs or receives the second telegram 225 via the second slave port 620 of the sixth slave subscriber 270 via the first slave communication path 320 to the second distribution port 710 of the second network distributor 235 from the second distribution port 710 of the second network distributor 235. In addition, the second network distributor 235 may be configured to receive or output the third telegram with ELAN ID 3, and the fourth telegram with ELAN ID 4, via the first distribution port 708 of the second network distributor 235 and via the third distribution port 715 of the second network distributor 235, respectively.

Furthermore, the configuration of the third network distributor 250 may provide that the third network distributor 250 receives or outputs the first telegram 220 with the ELAN ID 1 and the second telegram 225 with the ELAN ID 2 respectively via the first distribution port 720 of the third network distributor 250 and via the third distribution port 730 of the third network distributor 250. Furthermore, the third network distributor 250 may be configured to receive or output the third telegram with the ELAN ID 3, and the fourth telegram with the ELAN ID 4, via the first distribution port 720 of the third network distributor 250 and via the second distribution port 725 of the third network distributor 250, respectively.

A setting of the fourth network distributor 255 may mean that the fourth network distributor 255 receives or outputs the first telegram 220 with the ELAN ID 1 and the second telegram 225 with the ELAN ID 2 via the first distribution port 735 of the fourth network distributor 255 and via the third distribution port 745 of the fourth network distributor 255, respectively. Furthermore, the fourth network distributor 255 may receive or output the third telegram with ELAN ID 3, and the fourth telegram with ELAN ID 4, via the third distribution port 745 of the fourth network distributor 255 and via the second distribution port 740 of the fourth network distributor 255, respectively. In the automation network 100, the aforementioned configurations of the first network distributor 230 to fourth network distributor 255 allow the master subscriber 205 to receive the first telegram 220, the second telegram 225, as well as the third telegram to the placeholder X, and the fourth telegram to the placeholder X, back despite a line interference, and the master subscriber 205 thereby reaches all other network subscribers 200, in particular those that are adjacent to the first line interference 810.

The routing of the first telegram 220 and the second telegram 225 through the first network distributor 230 to the fourth network distributor 525 described in FIG. 2 is based on ELAN IDs, which the first telegram 220 and the second telegram 225 each comprise. The ELAN IDs may be formed in a similar way to VLAN IDs and may be located in a tag field of a telegram, wherein a telegram is preferably embodied in the form of an EtherCAT telegram.

If the routing of the telegrams in the automation network 100 in FIG. 2 is e.g. based on a routing with MAC addresses (MAC: Media Access Control), then the first master port 400 e.g. comprises the MAC address MAC20 and the second master port 415 e.g. comprises the MAC address MAC10. The first telegram 220 may then have a first MAC address MAC1 and the second telegram 225, which the master subscriber 205 outputs via the second master port 415, may comprise a second MAC address MAC2. If the master subscriber 205 outputs the third telegram via the first master port 400, the third telegram may e.g. comprise a third MAC address MAC3. Furthermore, the master subscriber 205 may output the fourth telegram via the second master port 415, having a fourth MAC address MAC4. The master subscriber 205 may set the first network distributor 230 to fourth network distributor 255 such that, for example, when the first network distributor 230 receives the second telegram 225 via the second distribution port 705 of the first network distributor 230, the second MAC address MAC2 of the second telegram 225 is set to the MAC address MAC20 of the first master port 400.

Furthermore, the master subscriber 205 may configure the second network distributor 235 to set the first MAC address MAC to the MAC address MAC10 of the second master port 415 upon receiving the first telegram 220 with the first MAC address MAC11 via the second distribution port 710 of the second network distributor 235. Furthermore, the master subscriber 205 may configure the third network distributor 250 to set the third network distributor 250 to the MAC address MAC20 of the first master port 400 of the master subscriber 205 upon receiving the fourth telegram with a fourth MAC address MAC4 via the second distribution port 725 of the third network distributor 250. The fourth network distributor 255 may be set by the master subscriber 205 in such a way that the fourth network distributor 255 sets the third MAC address MAC3 of the third telegram to the MAC address MAC10 of the second master port 415 of the master subscriber 205 upon receiving the third telegram with the third MAC address MAC3 via the second distribution port 740 of the fourth network distributor 255. The MAC addresses mentioned respectively refer to the target addresses of the individual telegrams.

As an alternative to routing the telegrams via MAC addresses, routing the telegrams via destination IDs using a so-called ROUT-TAG tag field or VLAN IDs using a VLAN-TAG tag field is also conceivable, although this is not described.

The above description for the setting of the first network distributor 230 to the fourth network distributor 255 with respect to the receipt of the first telegram 220 as well as the second telegram 225 and the third telegram or the fourth telegram referred to the change of the MAC address with respect to the target MAC address corresponding to the respective MAC address of the first master port 400 and the second master port 415, respectively, since the first telegram 220 as well as the second telegram 225 and the third telegram as well as the fourth telegram in normal operation respectively correspond to the first master port 400 with the MAC address MAC20 and the second master port 415 with the MAC address MAC20.

Now, if the first line interference 810 occurs between the fourth slave subscriber 266 and the fifth slave subscriber 268 on the first slave communication path 320 as well as on the second slave communication path 325, the first telegram 220 reaches the first network distributor 230 via the second slave communication path 325. The first network distributor 230 is configured to receive the first telegram 220 via the second distribution port 705 of the first network distributor 230, and to set the first MAC address MAC1 to the MAC address MAC20 of the first master port 400. Furthermore, the first network distributor 230 outputs the first telegram 220 to the master subscriber 205 via the first distribution port 700 of the first network distributor 230 and via the second master communication path 315. The master subscriber 205 receives the first telegram 220 via the first master port 400, which has the MAC address MAC20.

The second telegram 225 issued by the master subscriber 205 via the second master port 415 and the second master communication path 315 reaches the second network distributor 235 after the second telegram 225 is fed back due to the first line interference 810 via the first slave communication path 320 and via the second distribution port 710 of the second network distributor 235. The second network distributor 235 is configured to set the second MAC address MAC2 of the second telegram 225 to the MAC address MAC10 of the second master port 415, such that the second network distributor 235 outputs the second telegram 225 to the second switch 245 via the third distribution port 715 of the second network distributor 235 and the first master communication path 310.

The second switch 245 including the third network distributor 250 and the fourth network distributor 255 is configured to output the second telegram 225 to the second master port 415 of the master subscriber 205 having the MAC address MAC10, via the third distribution port 745 of the fourth network distributor 255 and the first master communication path 310. For example, the first line interference 810 does not affect the telegram path of the third telegram and the fourth telegram, so that the previous settings for the third telegram having the third MAC address MAC3 in the fourth network distributor 255 and the setting for the fourth telegram with the fourth MAC address MAC4 in the third network distributor 250 still apply.

Figure 3:
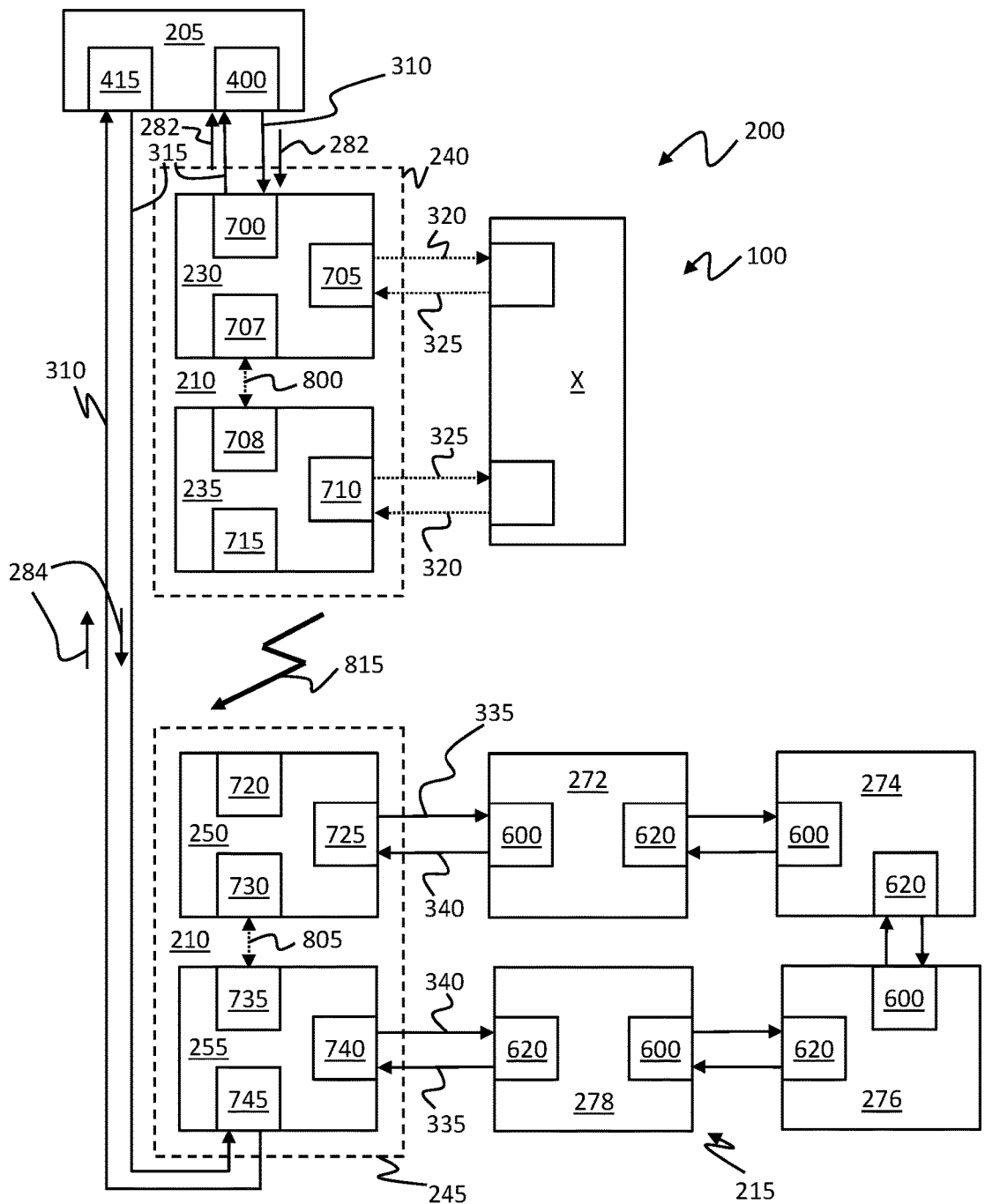
FIG. 3 shows a schematic structure of an automation network with network subscribers according to a third embodiment.

FIG. 3 shows an extension of the automation network 100 shown in FIGS. 1 and 2. In contrast to the automation network 100 with network subscribers 200 shown in FIGS. 1 and 2, the telegram traffic based on the output of the third telegram 282 with the ELAN ID 3 via the first master port 400 of the master subscriber 205 and of the fourth telegram 284 with the ELAN ID 4 via the second master port 415 is referred to below in FIG. 3—at first for the normal operation, in which no line interference occurs. The master subscriber 205 is embodied to output the third telegram 282 having the ELAN ID 3 to the first switch 240 via the first master communication path 310, wherein the first switch 240 comprises the first network distributor 230 and the second network distributor 235. The first network distributor 230 is configured to receive the third telegram 282 via the first distribution port 700 of the first network distributor 230, and to output the third telegram 282 via the third distribution port 707 of the first network distributor 230 to the first distribution port 708 of the second network distributor 235 via the first internal connection 800.

The second network distributor 235 is configured to forward the third telegram 282 to the second switch 245 via the third distribution port 715 of the second network distributor 235 via the first master communication path 310, the second switch 245 comprising the third network distributor 250 and the fourth network distributor 255. The third network distributor 250 receives the third telegram 282 via the first distribution port 720 of the third network distributor 250 and outputs the third telegram 282 to a seventh slave subscriber 272 via a third slave communication path 335. The seventh slave subscriber 272 is configured to receive the third telegram 282 via the first slave port 600 of the seventh slave subscriber 272, to process the third telegram 282 on the fly, and to forward the third telegram 282 via the second slave port 620 of the seventh slave subscriber 272 to the eighth slave subscriber 274 via the third slave communication path 335. The eighth slave subscriber 274 is configured to receive the third telegram 282 via the first slave port 600 of the eighth slave subscriber 274, to process the third telegram 282 on the fly, and to output the third telegram 282 to the ninth slave subscriber 276 via the second distribution port 620 of the eighth slave subscriber 274 via the third slave communication path 335.

The ninth slave subscriber 276 receives the third telegram 282 via the first slave port 600 of the ninth slave subscriber 276, processes the third telegram 282 on the fly similar to the previous slave subscribers, and outputs the third telegram 282 to the tenth slave subscriber 278 via the second slave port 620 of the ninth slave subscriber 276 via the third slave communication path 335. The tenth slave subscriber 278 is configured to receive the third telegram 282 via the first slave port 600 of the tenth slave subscriber 278, to process the third telegram 282 on the fly, and to forward the third telegram 282 via the second slave port 620 of the tenth slave subscriber 278 to the fourth network distributor 255 via the third slave communication path 335. The fourth network distributor 255 is configured to receive the third telegram 282 via the second distribution port 740 of the fourth network distributor 255, and to forward the third telegram 282 via the third distribution port 745 of the fourth network distributor 255 to the master subscriber 205 via the first master communication path 310. The master subscriber 205 receives the third telegram 282 via the second master port 415.

Furthermore, the master subscriber 205 is configured to output the fourth telegram 284 to the second switch 245 via the second master communication path 315. The fourth network distributor 255 of the second switch 245 receives the fourth telegram 284 with the ELAN ID 4 via the third distribution port 745 of the fourth network distributor 255, and forwards the fourth telegram 284 to the tenth slave subscriber 278 via the second distribution port 740 of the fourth network distributor 255 and the fourth slave communication path 340. The tenth slave subscriber 278 receives the fourth telegram 284 via the second slave port 620 of the tenth slave subscriber 278 and forwards it to the ninth slave subscriber 276 via the first slave port 600 of the tenth slave subscriber 278 without any processing. The ninth slave subscriber 276 receives the fourth telegram 284 via the second slave port 620 of the ninth slave subscriber 276 and forwards the fourth telegram 284 via the first slave port 600 of the ninth slave subscriber 276 and the fourth slave communication path 340 to the eighth slave subscriber 274 without processing.

The eighth slave subscriber 274 receives the fourth telegram 284 via the second slave port 620 of the eighth slave subscriber 274 and forwards it directly (without processing) to the seventh slave subscriber 272 via the first slave port 600 of the eighth slave subscriber 274 and via the fourth slave communication path 340. The seventh slave subscriber 272 receives the fourth telegram 284 via the second slave port 620 of the seventh slave subscriber 272 and outputs it to the third network distributor 250 via the first slave port 600 of the seventh slave subscriber 272 and the fourth slave communication path 340. The third network distributor 250 receives the fourth telegram 284 via the second distribution port 725 of the third network distributor 250 and outputs the fourth telegram 284 to the first switch 240 via the first distribution port 720 of the third network distributor 250 via the second master communication path 315. The first switch 240 is configured to receive the fourth telegram 284 via the second network distributor 235. The second network distribution device 235 receives the fourth telegram 284 via the third distribution port 715 of the second network distributor 235 and forwards it to the third distribution port 707 of the first network distribution device 230 via the first distribution port 708 of the second network distribution device 235 and the first internal connection 800.

The first network distributor 230 outputs the fourth telegram 284 to the first master port 400 of the master subscriber 205 via the second master communication path 315. The previous description referred to normal operation, that is, the telegram traffic or telegram path of the third telegram 282 as well as the fourth telegram 284 without a line interference having occurred. The master subscriber 205 receives the fourth telegram 284 via the first master port 400 and is in normal operation embodied to discard the fourth telegram 284 and to evaluate only the third telegram 282 that has been processed by the slave subscribers on the fly, since the telegrams originate from the identical data packet.

Also, the explained third slave communication path 335 forms a dual ring structure with the fourth slave communication path 340 between the second distribution port 725 of the third network distributor 250 and the second distribution port 740 of the fourth network distributor 745.

Furthermore, telegram traffic of the master subscriber 205, which has been described in connection with the telegram traffic described in FIGS. 1 and 2, may be implemented in a similar manner using the first telegram 220 and the second telegram 225, without limiting the scope of protection. The placeholder X, which in FIG. 3 is exemplarily connected to the first network distributor 230 as well as to the second network distributor 235 via the first slave communication path 320 and via the second slave communication path 325, may be representative of a slave subscriber and/or of a chain of slave subscribers as connected e.g. to the third network distributor 250 and to the fourth network distributor 255 via the third slave communication path 335 and via the fourth slave communication path 340. For example, the slave subscriber 215 or the chain of slave subscribers represented by the placeholder X may be addressed via the first telegram 220 and the second telegram 225.

After describing the normal operation explained above in connection with Fig., reference is now made to the error mode of the automation network 100 shown in FIG. 3. If, for example, as shown in FIG. 3, a second line interference 815 occurs between the first switch 240 and the second switch 245 on the first master communication path 310 and the second master communication path 315, respectively, the third telegram 282 as well as the fourth telegram 284 cannot be routed without further ado, i.e. without changes to be made in the automation network 100.

Similarly, the first and second telegrams may take the telegram path described in FIG. 2, could not easily be routed in the automation network 100 due to the second line interference 815. The second line interference 815 may be similar to the first line interference 810 in FIG. 2 and may comprise a physical interruption of the data line or the transmission medium. If the adjacent switch, i.e. the first switch 240 and the second switch 245 in the example shown in FIG. 3, detects that there is no connection between the first switch 240 and the second switch 245, i.e. the first master communication path 310 and the second master communication path 315 are interrupted, then both the first switch 240 and the second switch 245 are embodied to initiate error operation and to enter an error information in the third telegram 282 and in the fourth telegram 284, respectively. Furthermore, each network distributor may also be embodied to initiate the error operation, since it is not mandatory that the first network distributor 230 and the second network distributor 235 of the first switch 240 and the third network distributor 250 and the fourth network distributor 255 of the second switch 245 are directly connected to each other.

The error information that the second network distributor 235 e.g. sets for the third distribution port 715 of the second network distributor 235, as well as the third network distributor 250 sets for the first distribution port 720 of the third network distributor 250, may e.g. be based in an alternative ELAN ID for said ports. For example, the alternative ELAN ID may be 0x403 (in hexadecimal) for ELAN ID 3, as well as the alternative ELAN ID may be 0x404 (in hexadecimal) for ELAN ID 4. For completeness, the alternative ELAN ID may be 0x401 (in hexadecimal system) for the first telegram 220 with ID 1, and the alternative ELAN ID may be 0x402 (in hexadecimal system) for the second telegram 225 having ELAN ID 2. The alternative ELAN IDs mentioned may be set for the individual network distributors for the first distribution port and the third distribution port, respectively, each of which would have a connection to an adjacent network distributor in normal operation, by the master subscriber 205.

Consequently, the second network distributor 235 as well as the third network distributor 250 are each embodied to check whether an alternative route for the third telegram 282 as well as for the fourth telegram 284 is stored for said network distributors after the detection of the second line interference 815, i.e. the interruption of the connection between the second network distributor 235 and the third network distributor 250. For the alternate route of the third telegram 282, the second network distributor 235 may be configured to forward the third telegram 282 to the first network distributor 230 via the first distribution port 708 of the second network distributor 235 and the first internal connection 800 after successfully checking for the alternate route. The first network distributor 230 receives the third telegram 282 via the third distribution port 707 of the first network distributor 230 and returns the third telegram 282 to the first master port 400 of the master subscriber 205 via the first distribution port 700 of the first network distributor 230 and the second master communication path 315. The fourth telegram 284 is returned by the third network distributor 250 to the seventh slave subscriber 272 via the second distribution port 725 of the third network distributor 250 and via the first slave communication path 335.

The seventh slave subscriber 272 receives the fourth telegram 284 via the first slave port 600 of the seventh slave subscriber 272, processes the fourth telegram 284 on the fly, and outputs the fourth telegram 284 in the alternate telegram route via the second slave port 620 of the seventh slave subscriber 272 via the third slave communication path 335 to the eighth slave subscriber 274. The eighth slave subscriber 274 receives the fourth telegram 284 via the first slave port 600 of the eighth slave subscriber 274, processes the fourth telegram 284 on the fly, and forwards the fourth telegram 284 to the ninth slave subscriber 276 via the second slave port 620 of the eighth slave subscriber 274 and via the third slave communication path 335.

The ninth slave subscriber 276 receives the fourth telegram 284 via the first slave port 600 of the ninth slave subscriber 276, processes the fourth telegram 284 on the fly, and outputs the fourth telegram 284 to the tenth slave subscriber 278 via the second slave port 620 of the ninth slave subscriber 276 and the third slave communication path. The tenth slave subscriber 278 receives the fourth telegram 284 via the first slave port 600 of the tenth slave subscriber 278, processes the fourth telegram 284 on the fly, and forwards the fourth telegram 284 to the fourth network distributor 255 via the second slave port 620 of the tenth slave subscriber 278 and the third slave communication path 335.

The fourth network distributor 255 receives the fourth telegram 284 via the second distribution port 740 of the fourth network distributor 255 and returns the fourth telegram 284 to the master subscriber 205 via the third distribution port 745 of the fourth network distributor 255 and the first master communication path 310. The master subscriber 205 receives the fourth telegram 284 via the second master port 415.

As an alternative to setting the error information in the form of the alternative ELAN ID, as has been explained, a free bit in the telegram may also be used for the error information or for routing. If ELAN IDs are used for routing the telegrams as described, the telegrams, which are preferably embodied as EtherCAT telegrams, comprise a so-called ELAN-TAG tag field. The ELAN-TAG tag field may be similar to the VLAN-TAG tag field, but may contain additional information if the corresponding telegram has been fragmented. Fragmentation may e.g. be performed by any of the first to fourth network distributors 230, 235, 250, 255 shown in FIG. 3. The master subscriber 205 subsequently needs the additional information about the fragmentation when assembling the individual telegram fragments. Furthermore, a telegram that has an ELAN TAG tag field also has a so-called ELAN end TAG tag field in the telegram, i.e. a data field ahead of the checksum field that comprises information that will be explained in more detail later. The ELAN ID in the ELAN-TAG tag field e.g. comprises 12 bits with bit 11 in the ELAN-TAG tag field being set when the error information for the alternative ELAN ID is set, e.g. by the corresponding adjacent network distributor or the adjacent switch.

Alternatively, if MAC addresses are used for routing the telegrams in the automation network 100, it generally applies that the respective network distributor is configured to set the MAC address of the telegram to the MAC address MAC10 of the second master port 415 for telegrams that the respective network distributor is to output via the first distribution port, so that the corresponding network distributor may send the telegram back to the master subscriber 205. Similarly, the master subscriber 205 provides for the corresponding network distributors to set the MAC address of the telegram to the address MAC20, i.e. the MAC address of the first master port 400, for telegrams that are to be output to the subsequent network subscriber 200 via the third distribution port in each case. The aforementioned settings generally enable the individual network distributors to send the telegrams back to the master subscriber 205 via the respective other master communication path even if a line interference is detected between the network distributors, that is, on the first master communication path 310 and on the second master communication path 315.

Furthermore, the telegrams must have an additional identifier so that the master subscriber 205 or other network subscribers 200 in the automation network 100 may recognize that a line interference has occurred in the automation network 100 on one of the communication paths and the MAC address of a telegram that has already been exchanged must not be exchanged again, since the automation network 100 may be used advantageously for detecting a single line interference. For another line interference when the error information is already set, that is, when the alternative ELAN ID or alternative MAC address is already set, the slave subscribers as well as the network distributors are preferably embodied to discard the corresponding telegram. In the case of the ELAN ID for routing, no additional identifier is therefore required in the telegram to indicate that error operation has already been triggered.

Figure 4:
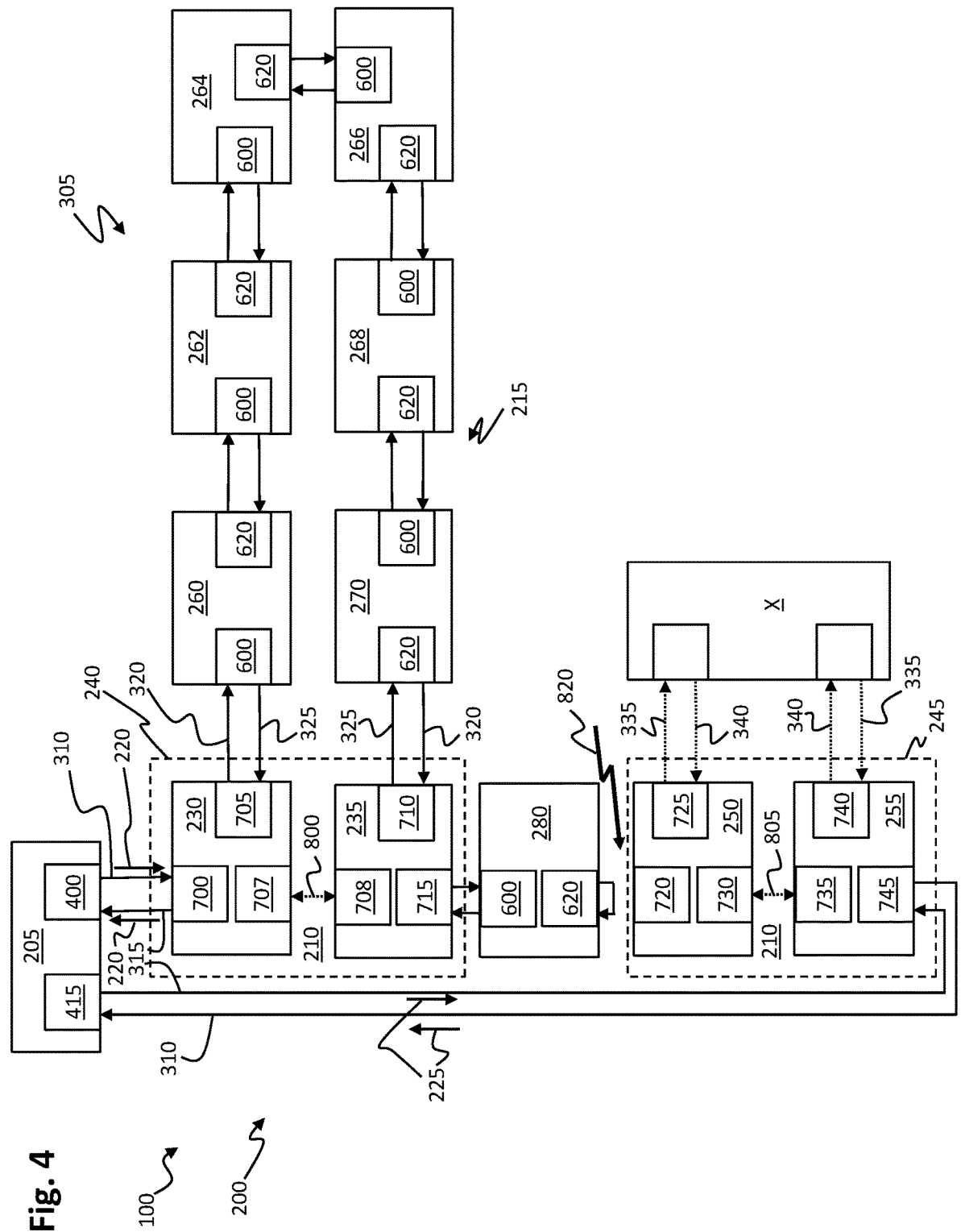
FIG. 4 shows a schematic structure of an automation network with network subscribers according to a fourth embodiment.

FIG. 4 shows an alternative arrangement of the network subscribers 200 in the automation network 100. For example, the basic structure of the arrangement of the network subscribers 200 in FIG. 4 is similar to the arrangement of the network subscribers 200 in FIG. 2. Unlike the arrangement of network subscribers 200 in FIG. 2, where the first line interference 810 has occurred between the fourth slave subscriber 266 and the fifth slave subscriber 268, in FIG. 4, for example, a third line interference 820 occurred between an eleventh slave subscriber 280 and the third network distributor 250 of the second switch 245. The eleventh slave subscriber 280 is e.g. located between the first switch 240 and the second switch 245, and the connection to the second switch 245 may be physically interrupted by said third line interference 820. The eleventh slave subscriber 280 is connected to the third distribution port 715 of the second network distributor 235 via the first master communication path 310 and via the second master communication path 315 and via the first slave port 600 of the eleventh slave subscriber 280.

For the connections of the other slave subscribers 215 or network subscribers 200 in the automation network 100 in FIG. 4, reference is made to the descriptions of the above figures and the features will not be repeated here. Furthermore, the features concerning the assignment of the alternative ELAN IDs or the MAC addresses for the individual ports of the network subscribers 200 in the automation network 100 shall not be repeated in FIG. 4. Likewise, the detailed description of the telegram traffic starting from the master subscriber 205 is not repeated. In the example shown in FIG. 4, the eleventh slave subscriber 280 is embodied to set the first error information in the first telegram 220 after the eleventh slave subscriber 280 has detected the third line interference 820 to the subsequent third network distributor 250. In this context, the first error information may e.g. comprise setting the ELAN ID 1 to the alternative ELAN ID 0x401 (in the hexadecimal system).

Due to the short-circuited transmitter and receiver in the second slave port 620 of the eleventh slave subscriber 280, the eleventh slave subscriber 280 is embodied to forward the first telegram 220 to the first switch 240 via the first slave port 600 of the eleventh slave subscriber 280 via the second master communication path 315. The first switch 240 is embodied to receive the first telegram 220 with the alternate ELAN ID, as mentioned above, via the third distribution port 715 of the second network distributor 235. The second network distribution device 235 outputs the first telegram 220 to the third distribution port 707 of the first network distribution device 230 via the first distribution port 708 of the second network distribution device 235 and the first internal connection 800. The first network distributor 230 outputs the first telegram 220 to the first master port 400 of the master subscriber 205 via the first distribution port 700 of the first network distributor 230 and the second master communication path 315.

Alternatively, if the first telegram 220 already e.g. comprised the first error information, that is, e.g. the alternate ELAN ID having a value of 0x401 (in the hexadecimal system), the eleventh slave subscriber 280 would be configured to discard the first telegram 220, provided that the eleventh slave subscriber 280 detected the third line interference 820 to the subsequent third network distributor 250. This is due to the fact that the automation network 100 is embodied to detect only one line interference, and when the second line interference occurs, the network subscribers 200 would be embodied to overwrite the previous first error information and thereby restore the first telegram 220 to its original state, so that the first telegram 220 would circulate in the automation network without the master subscriber 205 being able to determine that a line interference, i.e. an error case, has occurred in the automation network 100.

A possible telegram structure of the first telegram 220, the second telegram 225, the third telegram 282 as well as of the fourth telegram 284, which may each be in the form of EtherCAT telegrams, may be implemented according to the following Table 1, where Table 1 lists the corresponding number of bytes of a data field and/or a plurality of data fields and/or a tag field and/or a plurality of tag fields in the telegram as well as their meaning:

TABLE 1

Number of bytes of data or tag fields in a telegram, as well as their meaning

| Byte | Meaning |
|---|---|
| 0 to 5 | Target MAC address |
| 6 to 11 | Sender MAC address |
| 12 to 13 | Protocol identification (value: 0xB6FE) |
| 14 to 19 | ELAN TAG |
| | "Type", 4 bit (value: 0) |
| | "Priority", 3 bit |
| | "FragAllowed", 1 bit |
| | "ELAN ID", 12 bit |
| | "Reserve", 4 bit |
| | "FragOffset", 8 bit |
| | "FrameNo", 16 bit |
| 20 | Ethertype (value: 0x88A4) |
| from 21 | Ethernet data section |
| n | Last byte of the Ethernet data section or "Padding" or "Padding Length". |
| n + 1 | ELAN-END TAG, 1 byte |
| | "FragFollows", 1 bit |
| | "NextPrio", 3 bit |
| | "Padding", 1 bit |
| (n + 1) to (n + 4) | Checksum |

According to the IEEE 802.3 standard for the packet-oriented Ethernet data telegram format structure, an Ethernet data frame also has a preamble and a Start Frame Delimiter (SFD) data field, which are not included in Table 1. Nevertheless, the first telegram 220, the second telegram 225, the third telegram 282 and the fourth telegram 284 each include a preamble and a Start Frame Delimiter (SFD) field.

Also in the case that the routing of the first telegram 220, the second telegram 225, the third telegram 282 as well as of the fourth telegram 284 is based on the use of the ELAN TAG tag field and the routing based on ELAN IDs, the first telegram 220, the second telegram 225, the third telegram 282 as well as the fourth telegram 284 each comprise the target MAC data field with the target MAC address as well as the sender MAC data field with the sender MAC address of the receiving as well as the sending network subscriber 200.

The protocol identification data field comprises the value 0xB6FE (in hexadecimal system), which is assigned to the ELAN-TAG tag field. Preferably, the ELAN-TAG tag field is used provided that the first telegram 220, the second telegram 225, the third telegram 282 as well as the fourth telegram 284 may be fragmented by the first network distributor 230, the second network distributor 235, the third network distributor 250 and/or the fourth network distributor 255, since the ELAN-TAG tag field comprises the information about the fragmenting of the first telegram 220, the second telegram 225, the third telegram 282 as well as the fourth telegram 284. For comparison, the protocol identification data field would have the value 0x8100 (in hexadecimal) if the tag field is formed as a VLAN TAG and comprises a VLAN ID for routing the first telegram 220, the second telegram 225, the third telegram 282 as well as the fourth telegram 284. Preferably, the VLAN-TAG tag field would be used for the case of transmitting the telegrams without fragmentation in the automation network 100.

The ELAN-TAG tag field comprises a 4-bit Type data field by which the ELAN-TAG tag field with the value zero is identified by default and where the values 1 to 3 are e.g. reserved for possible extensions. Furthermore, the ELAN-TAG tag field comprises a 3-bit priority data field with a priority level of the telegram, the priority data field with the priority level being similar to the VLAN priority in a VLAN-TAG tag field. Using a 1-bit FragAllowed data field, a possible fragmentation or a fragmentability of the telegram is indicated to the receiving network subscriber 200. The ELAN ID may be used to route the corresponding telegram in the automation network 100, with the ELAN ID being e.g. located in an ELAN ID data field comprising 12 bits. The ELAN ID may be embodied in a similar manner to the VLAN ID, e.g. in the form of a hexadecimal number, as explained above.

Furthermore, the ELAN-TAG tag field has a 4-bit reserve data field for which no fixed assignment has yet been provided. An 8-bit FragOffset data field in the ELAN-TAG tag field is used to specify an offset of the data in the telegram, wherein the offset is calculated from the Ethertype data field of the telegram. Finally, the ELAN-TAG tag field further comprises a 16-bit FrameNo data field. The FrameNo data field comprises a number or a number of the telegram, which is incremented or incremented by the sender or by the person issuing the telegram in the automation network 100.

Byte 20 in the telegram e.g. comprises an Ethertype data field. An EtherCAT telegram is identified by the value 0x88A4 (in hexadecimal system) in the Ethertype data field, because the EtherCAT protocol represents the used protocol of the next higher layer within the user data, i.e. within an Ethernet data section. A layer and a next higher layer are defined according to the OSI model. For comparison a telegram would have the value 0x0800 (in hexadecimal system) in the Ethertype data field, provided that the used protocol of the next higher layer within the user data forms the IP protocol (IP: Internet Protocol).

An Ethernet data section in the telegram may be embodied starting at byte 21, wherein the Ethernet data section in an EtherCAT telegram comprises an EtherCAT header and a plurality of EtherCAT datagrams. The EtherCAT header comprises an EtherCAT type data field with the value 1 or with the value 6, wherein a processing of the EtherCAT telegram is indicated by the value 1 of the EtherCAT type data field of a processor of a slave subscriber, whereas a blocking of the processing of the EtherCAT telegram is indicated by the value 6 of the EtherCAT type data field of the processor of a slave subscriber.

For example, the byte n may be in the form of the last byte of the Ethernet data section. Alternatively, the byte n may represent a padding data field, provided that via the EtherCAT telegram as user data e.g. less than 46 respectively 42 bytes (without respectively with a VLAN TAG according to the IEEE 802.1Q standard) are to be transmitted, wherein the preamble and the Start Frame Delimiter (SFD) data field are not counted. With the additional bytes added as pad which are inserted into the EtherCAT telegram, the Ethernet data telegram may be brought to the required minimum size of 64 bytes.

Alternatively, the byte n may be in the form of a padding length data field comprising a number or length of bytes appended as a pad.

If an ELAN-TAG tag field is located in the header section of a telegram, an end section of the telegram comprises a 1-byte ELAN-END-TAG data field ahead of a CRC data field that includes the value of a checksum. The ELAN-END-TAG data field has a 1-bit FragFollows data field, which is used to indicate whether at least one fragment of the fragmented telegram still follows. Furthermore, the ELAN-END-TAG data field comprises a 3-bit NextPrio data field that indicates the priority of the next telegram, provided that the priority of the following telegram is known. Finally, the ELAN-END-TAG data field may also comprise a 1-bit padding data field. Provided that the fragment of the telegram is the last fragment of the telegram and the last fragment includes bytes or padding bytes attached as pad, the bit of the padding data field is set and the byte n of the telegram has the number or the length of the padding bytes (padding length). The bytes (n+1) to (n+4) in the telegram indicate the CRC data field with the checksum of the telegram.

The automation network 100 comprising network subscribers 200 shown in the figures may also be implemented with more than two switches 210 and more than four network distributors. Similarly, the network distributors may each include more than three distribution ports. The additional distribution ports may either comprise the functionality of the first distribution ports and the third distribution ports of the network distributors, provided that further network distributors are connected to the additional distribution ports, or may comprise the functionality of the second distribution ports, to each of which only one slave subscriber 215 or a chain of slave subscribers 215 is connected.

Furthermore, the proposed method together with the proposed automation network 100 is not limited to telegram traffic in control mode, but may equally be used successfully during a configuration phase of the automation network 100 together with its network subscribers 200, even in the event that a line interference occurs during the configuration phase of the automation network 100. Thus, even for the configuration phase in which the further network subscribers 200 of the automation network 100 are e.g. first detected by the master subscriber 205, continuous communication of the master subscriber 205 with the further network subscribers 200 to be detected may be guaranteed.

The invention has been described in detail using preferred embodiment examples. Instead of the described examples of embodiment, further examples of embodiment are conceivable, which may comprise further variations or combinations of described features. For this reason, the invention is not limited by the disclosed examples, since other variations may be derived therefrom by those skilled in the art without departing from the protective scope of the invention.

TABLE 2

| List of reference numerals | |
| --- | --- |
| 100 automation network | 300 first double-ring structure |
| 200 network subscriber | 305 second double-ring structure |
| 205 master subscriber | 310 first master communication path |
| 210 switch | 315 second master communication path |
| 215 slave subscriber | 320 first slave communication path |
| 220 first telegram | 325 second slave communication path |
| 225 second telegram | 335 third slave communication path |
| 230 first network distributor | 340 fourth slave communication path |

TABLE 2-continued

List of reference numerals

| | |
|---|---|
| 235 second network distributor | 400 first master port |
| 240 first switch | 415 second master port |
| 245 second switch | 500 first switching port |
| 250 third network distributor | 515 second switching port |
| 255 fourth network distributor | 530 third switching port |
| 260 first slave subscriber | 550 fourth switching port |
| 262 second slave subscriber | 600 first slave port |
| 264 third slave subscriber | 620 second slave port |
| 266 fourth slave subscriber | 700 first distribution port of first network distributor |
| 268 fifth slave subscriber | 705 second distribution port of first network distributor |
| 270 sixth slave subscriber | 707 third distribution port of first network distributor |
| 272 seventh slave subscriber | 708 first distribution port of second network distributor |
| 274 eighth slave subscriber | 710 second distribution port of second network distributor |
| 276 ninth slave subscriber | 715 third distribution port of second network distributor |
| 278 tenth slave subscriber | 720 first distribution port of third network distributor |
| 280 eleventh slave subscriber | 725 second distribution port of third network distributor |
| 282 third telegram | 730 third distribution port of third network distributor |
| 284 fourth telegram | 735 first distribution port of fourth network distributor |
| TX transmitter | 740 second distribution port of fourth network distributor |
| RX receiver | 745 third distribution port of fourth network distributor |
| X placeholder | 800 first internal connection |

The invention claimed is:

1. An automation network comprising:
at least one primary subscriber,
at least one switch, and
at least one slave network subscriber;
wherein the primary subscriber comprises primary ports, the switch comprises switching ports, and the network subscriber comprises subscriber ports, each of which ports comprises a transmitter configured for transmitting telegrams and a receiver configured for receiving telegrams,
wherein the transmitter of a first of the primary ports is connected to the receiver of a first of the switching ports via a first primary communication path and the transmitter of a second of the switching ports is connected to the receiver of a second of the primary ports via the first primary communication path,
wherein the transmitter of the second primary port is connected to the receiver of the second switching port via a second primary communication path and the transmitter of the first switching port is connected to the receiver of the first primary port via the second primary communication path to embody a first dual ring structure,
wherein the transmitter of a third of the switching ports is connected to the receiver of a first of the subscriber ports via a first subscriber communication path and the transmitter of a second of the subscriber ports is connected to the receiver of a fourth of the switching ports via the first subscriber communication path,
wherein the transmitter of the fourth switching port is connected to the receiver of the second subscriber port via a second subscriber communication path and the transmitter of the first subscriber port is connected to the receiver of the third switching port via the second subscriber communication path to embody a second dual ring structure,
wherein the primary subscriber is configured to send two telegrams based on a same data packet,
wherein the primary subscriber is configured to output a first of the two telegrams to the switch via the transmitter of the first primary port and via the first primary communication path, and to output a second of the two telegrams to the switch via the transmitter of the second primary port and via the second primary communication path,
wherein the switch is configured to receive the first telegram via the receiver of the first switching port and to forward the first telegram via the transmitter of the third switching port to the receiver of the first subscriber port, via the first subscriber communication path,
wherein the network subscriber is configured to forward the first telegram to the receiver of the fourth switching port after processing on the fly, via the transmitter of the second subscriber port and via the first subscriber communication path,
wherein the switch is configured to forward the first telegram received via the receiver of the fourth switching port and via the transmitter of the second switching port to the receiver of the second primary port, via the first primary communication path,
wherein the switch is configured to receive the second telegram via the receiver of the second switching port and to forward the second telegram via the transmitter of the fourth switching port to the receiver of the second subscriber port, via the second subscriber communication path,
wherein the slave network subscriber is configured to forward the second telegram to the receiver of the third switching port via the transmitter of the first subscriber port, via the second subscriber communication path,
wherein the switch is configured to forward the second telegram received via the receiver of the third switching port and via the transmitter of the first switching port to the receiver of the first primary port, via the second primary communication path, and
wherein the switch and the network subscriber are, when in an error mode, configured to:
return the first telegram to the primary subscriber, so that the primary subscriber receives the first telegram via the receiver of the first primary port, and/or
return the second telegram to the primary subscriber, so that the primary subscriber receives the second telegram via the receiver of the second primary port.

2. The automation network according to claim 1, further comprising:
a plurality of such network subscribers, which are arranged in a chain,
wherein the plurality of network subscribers in the chain are respectively connected via the first subscriber port and via the second subscriber port, and
wherein the chain of network subscribers is connected to the third switching port and to the fourth switching port via the first subscriber communication path and via the second subscriber communication path.

3. The automation network according to claim 1, further comprising:
a plurality of such switches, which are arranged in a chain,
wherein the chain of switches is connected to the first primary port and the second primary port via the first primary communication path and via the second primary communication path, and
wherein the first telegram and/or the second telegram comprises address information which indicates to the corresponding switch whether the first telegram is intended for the first subscriber communication path and/or the second telegram is intended for the second subscriber communication path, and/or whether the first telegram is intended for the first primary communication path and/or the second telegram is intended for the second primary communication path.

4. The automation network according to claim 3,
wherein at least one such network subscriber is arranged between a first switch and a second switch of the plurality of switches, and/or between a first network distributor and a second network distributor,
wherein said at least one such network subscriber is, when in the error mode, configured to set first error information for the first telegram and/or second error information for the second telegram, and to return the first telegram with the first error information to the primary subscriber via the second primary communication path and/or to return the second telegram with the second error information to the primary subscriber via the first primary communication path.

5. The automation network according to claim 1,
wherein the switch comprises a first network distributor and a second network distributor, each having a plurality of distribution ports, and
wherein a first distribution port of the first network distributor corresponds to the first switching port of the switch and a second distribution port of the first network distributor corresponds to the third switching port of the switch.

6. The automation network according to claim 5, wherein a network distributor of the first and second network distributors adjacent to an interference and/or at least one such switch adjacent to an interference is, when in the error mode, configured to set a first error information for the first telegram and/or a second error information for the second telegram, and to return the first telegram with the first error information to the primary subscriber via the second primary communication path and/or to return the second telegram with the second error information to the primary subscriber via the first communication path.

7. The automation network according to claim 6, wherein said network distributor adjacent to an interference and/or said switch adjacent to an interference and/or at least one such network subscriber adjacent to an interference is, when in the error mode, configured to discard the first telegram with the first error information and/or the second telegram with the second error information, provided that the first telegram has the first error information and/or the second telegram has the second error information.

8. The automation network according to claim 1, wherein the first telegram and the second telegram are each configured as EtherCAT telegrams.

9. A method for transmitting data in an automation network comprising:
at least one primary subscriber,
at least one switch, and
at least one network subscriber;
wherein the primary subscriber comprises primary ports, the switch comprises switching ports, and the network subscriber comprises subscriber ports, each of which ports comprises a transmitter configured for transmitting telegrams and a receiver configured for receiving telegrams,
wherein the transmitter of a first of the primary ports is connected to the receiver of a first of the switching ports via a first primary communication path and the transmitter of a second of the switching ports is connected to the receiver of a second of the primary ports via the first primary communication path,
wherein the transmitter of the second primary port is connected to the receiver of the second switching port via a second primary communication path, and the transmitter of the first switching port is connected to the receiver of the first primary port via the second primary communication path to embody a first dual ring structure,
wherein the transmitter of a third of the switching ports is connected to the receiver of a first of the subscriber ports via a first subscriber communication path and the transmitter of a second of the subscriber ports is connected to the receiver of a fourth of the switching ports via the first subscriber communication path, and
wherein the transmitter of the fourth switching port is connected to the receiver of the second subscriber port via a second subscriber communication path and the transmitter of the first subscriber port is connected to the receiver of the third switching port via the second subscriber communication path to embody a second dual ring structure;
wherein, in the method:
the primary subscriber sends two telegrams based on the same data packet,
a first of the two telegrams is output to the switch via the transmitter of the first primary port and via the first primary communication path, and a second of the two telegrams is output to the switch via the transmitter of the second primary port and via the second primary communication path,
the switch receives the first telegram via the receiver of the first switching port and forwards the first telegram to the receiver of the first subscriber port via the transmitter of the third switching port and via the first subscriber communication path,
after processing on the fly, the network subscriber forwards the first telegram via the transmitter of the second subscriber port and via the first subscriber communication path to the receiver of the fourth switching port,
the switch forwards the first telegram received via the receiver of the fourth switching port to the receiver of the second primary port, via the transmitter of the second switching port and via the first primary communication path, the switch receives the second telegram via the receiver of the second switching port and forwards the second telegram to the receiver of the second subscriber port via the transmitter of the fourth switching port via the second subscriber communication path, the network subscriber forwards the second telegram to the receiver of the third switching port via the transmitter of the first subscriber port, via the second subscriber communication path, and the switch forwards the second telegram received via the receiver of the third switching port to the receiver of the first primary port, via the transmitter of the first switching port and via the second primary communication path; and wherein the switch and the network subscriber are configured to:
  return the first telegram to the primary subscriber when in an error mode, so that the primary subscriber receives the first telegram via the receiver of the first primary port, and/or
  return the second telegram to the primary subscriber when in an error mode, so that the primary subscriber receives the second telegram via the receiver of the second primary port.

10. The method according to claim 9,
wherein a plurality of such network subscribers is provided, which are arranged in a chain,
wherein the plurality of network subscribers in the chain are respectively connected via the first subscriber port and via the second subscriber port,
wherein the chain of network subscribers is connected to the third switching port and to the fourth switching port via the first subscriber communication path and via the second subscriber communication path.

11. The method according to claim 9,
wherein a plurality of such switches is provided, which are arranged in a chain,
wherein the chain of switches is connected to the first primary port and the second primary port via the first primary communication path and via the second primary communication path, and
wherein the first telegram and/or the second telegram comprises address information indicating to the corresponding switch whether the first telegram is intended for the first subscriber communication path and/or the second telegram is intended for the second subscriber communication path, and/or whether the first telegram is intended for the first primary communication path and/or the second telegram is intended for the second primary communication path.

12. The method according to claim 11,
wherein at least one such network subscriber is arranged between a first switch and a second switch of the plurality of switches, and/or between a first network distributor and a second network distributor,
wherein said at least one such network subscriber sets the first error information for the first telegram and/or the second error information for the second telegram in the error mode, and returns the first telegram with the first error information to the primary subscriber via the second primary communication path and/or the second telegram with the second error information to the primary subscriber via the first master communication path.

13. The method according to claim 9,
wherein the switch comprises a first network distributor and a second network distributor, each having a plurality of distribution ports,
wherein a first distribution port of the first network distributor corresponds to the first switching port of the switch and a second distribution port of the first network distributor corresponds to the third switching port of the switch.

14. The method according to claim 13, wherein a network distributor of the first and second network distributors adjacent to an interference and/or at least one such switch adjacent to an interference sets a first error information for the first telegram and/or a second error information for the second telegram in the error mode, and returns the first telegram with the first error information to the primary subscriber via the second primary communication path and/or returns the second telegram with the second error information to the primary subscriber via the first primary communication path.

15. The method according to claim 14, wherein, provided the first telegram comprises the first error information and/or the second telegram comprises the second error information, said network distributor adjacent to an interference and/or said switch adjacent to an interference and/or at least one such network subscriber adjacent to an interference, in the error mode, discards the first telegram with the first error information and/or the second telegram with the second error information.

16. The method according to claim 9, wherein the switch and the network subscriber detect an interference on the first primary communication path and/or on the second primary communication path and/or on the first subscriber communication path and/or on the second subscriber communication path, and trigger the error mode.

17. The method according to claim 9, wherein the first telegram and the second telegram are each configured as EtherCAT telegrams.

18. A method for transmitting data in an automation network for an error mode, wherein the automation network comprises:
  at least one primary subscriber,
  at least one switch, and
  at least one network subscriber,
  wherein the primary subscriber comprises primary ports, the switch comprises switching ports, and the network subscriber comprises subscriber ports, each of the ports comprising a transmitter and a receiver;
  wherein, in the method:
  the primary subscriber is configured to output a first telegram to a first of the switching ports via a first of the primary ports and a first primary communication path, and to output a second telegram to a second of the switching ports via a second of the primary ports and a second primary communication path, and
  the switch is configured to forward the first telegram to a first of the subscriber ports via a first subscriber communication path, and to forward the second telegram to a second of the subscriber ports via a second subscriber communication path, and
  wherein, in an error mode, the switch and the network subscriber are configured to:
    return the first telegram to the primary subscriber such that the primary subscriber receives the first telegram via the first primary port, and/or return the second telegram to the primary subscriber such that the primary subscriber receives the second telegram via the second primary port.

19. The method according to claim 18, wherein a network distributor adjacent to an interference and/or at least one such switch adjacent to an interference sets a first error information for the first telegram and/or a second error information for the second telegram in error mode, and returns the first telegram with the first error information to the primary subscriber via the second primary communication path and/or returns the second telegram with the second error information to the primary subscriber via the first primary communication path.

20. The method according to claim 18, wherein the switch and the network subscriber detect an interference on the first primary communication path and/or on the second primary communication path and/or on the first subscriber communication path and/or on the second subscriber communication path, and trigger the error mode.

* * * * *

UNITED STATES PATENT AND TRADEMARK OFFICE
CERTIFICATE OF CORRECTION

| | | |
|---|---|---|
| PATENT NO. | : 12,276,957 B2 | Page 1 of 1 |
| APPLICATION NO. | : 17/723696 | |
| DATED | : April 15, 2025 | |
| INVENTOR(S) | : Holger Büttner et al. | |

It is certified that error appears in the above-identified patent and that said Letters Patent is hereby corrected as shown below:

In the Claims

At Column 27, Line 28 (Claim 1):
"at least one slave network subscriber;"
Should be:
--at least one network subscriber;--

At Column 28, Line 50 (Claim 1):
"wherein the slave network subscriber is configured to"
Should be:
--wherein the network subscriber is configured to--

Signed and Sealed this
Twelfth Day of August, 2025

Coke Morgan Stewart
*Acting Director of the United States Patent and Trademark Office*